United States Patent (10) Patent No.: US 9,816,625 B2
Warbey (45) Date of Patent: Nov. 14, 2017

(54) SEAL CARRIERS FOR BALL VALVES, BALL VALVE ASSEMBLIES INCLUDING SUCH SEAL CARRIERS, AND RELATED METHODS

(71) Applicant: Flowserve Management Company, Irving, TX (US)

(72) Inventor: Paul Warbey, Irving, TX (US)

(73) Assignee: Flowserve Management Company, Irving, TX (US)

( * ) Notice: Subject to any disclaimer, the term of this patent is extended or adjusted under 35 U.S.C. 154(b) by 518 days.

(21) Appl. No.: 13/871,995

(22) Filed: Apr. 26, 2013

(65) Prior Publication Data

US 2014/0319395 A1 Oct. 30, 2014

(51) Int. Cl.
*F16K 5/06* (2006.01)
*F16J 15/02* (2006.01)

(52) U.S. Cl.
CPC ........... *F16K 5/0678* (2013.01); *F16J 15/028* (2013.01); *Y10T 137/0508* (2015.04)

(58) Field of Classification Search
CPC ..... F16K 5/0678; F16K 5/0689; F16J 15/028; Y10T 137/0508
USPC .................. 251/176, 180, 185, 192
See application file for complete search history.

(56) References Cited

U.S. PATENT DOCUMENTS

| | | | | |
|---|---|---|---|---|
| 2,575,818 | A * | 11/1951 | Kosatka | 277/373 |
| 3,114,386 | A * | 12/1963 | Dumm | 137/316 |
| 3,266,769 | A * | 8/1966 | Shand | 251/172 |
| 4,215,722 | A * | 8/1980 | Sigmon | 137/625.3 |
| 4,217,923 | A * | 8/1980 | Kindersley | 137/315.21 |
| 4,676,480 | A * | 6/1987 | Garceau et al. | 251/159 |
| 4,747,578 | A * | 5/1988 | Kivipelto et al. | 251/159 |
| 5,533,738 | A * | 7/1996 | Hoffmann | 277/388 |
| 5,611,516 | A * | 3/1997 | Reinicke et al. | 251/77 |
| 8,424,841 | B2 * | 4/2013 | Frenzel | 251/180 |
| 8,733,733 | B2 * | 5/2014 | Collison | F16K 5/0636 251/174 |
| 2008/0099081 | A1 * | 5/2008 | Yamamoto | 137/497 |
| 2008/0179558 | A1 * | 7/2008 | Lloyd | 251/180 |
| 2013/0015383 | A1 * | 1/2013 | Anderson et al. | 251/314 |

* cited by examiner

*Primary Examiner* — Marina Tietjen
*Assistant Examiner* — Frederick D Soski
(74) *Attorney, Agent, or Firm* — Magleby Cataxinos & Greenwood, P.C.

(57) ABSTRACT

A seal carrier for a ball valve includes a carrier body to be located between a ball and a portion of a valve body. The carrier body may have an annular channel for carrying a ring seal in a side to be located proximate the ball. A spring is located at a peripheral portion of the carrier body. An end portion of the spring is configured to abut against the portion of the valve body, and the spring is configured to provide a compressive force between the portion of the valve body and the ball in a direction parallel with the direction of fluid flow through the ball valve assembly. A ball valve assembly may include such seal carriers. Methods of forming such seal carriers are also included.

11 Claims, 5 Drawing Sheets

SEAL CARRIERS FOR BALL VALVES, BALL VALVE ASSEMBLIES INCLUDING SUCH SEAL CARRIERS, AND RELATED METHODS

TECHNICAL FIELD

The present disclosure relates generally to seal carriers for ball valves and ball valve assemblies. More particularly, embodiments of the present disclosure relate to seal carriers having a spring mechanism for forcing a seal into sealing engagement with a ball of a ball valve assembly.

BACKGROUND

Industrial fluid delivery systems routinely include one or more fluid valves configured to control the rate of, or completely terminate, fluid flow through the system. One type of valve commonly employed to control the flow of fluids in a fluid delivery system is a ball valve. A conventional ball valve generally includes a valve body having a fluid passageway therethrough. A ball or ball element is positioned within the valve body so as to be placed in the fluid passageway. The ball in a conventional ball valve has its own fluid conduit extending therethrough and defining a flow path through the ball. When the conduit in the ball is aligned with the fluid passageway through the valve body, fluid may flow through the valve generally unimpeded. If the ball is rotated such that the ball conduit is out of alignment with the valve body passageway, then the flow is restricted.

The ball is contained within the valve body between two valve seats with physical compression applied to the seats during assembly, such that the seats bear into the ball with force. In such designs, the valve seats act as a seal at the point at which they bear onto the ball, and as a seal at points at which they bear against the valve body. The valve seats also act as a spring to maintain the sealing force during operation of the valve. The "off" position usually corresponds to a position of the ball wherein the conduit is at right angles to the valve body passageway. However, lesser angular displacements may result in an "off" or partially "off" condition, depending upon the geometry of the valve components. The full "on" position is typified by the ball conduit being coaxially aligned with the fluid passageway of the valve body. A conventional ball valve provides varying degrees of flow restriction based upon the degree of alignment of the ball conduit with the valve body passageway. Thus, for a given pressure, flow is controlled by varying the degree of alignment of the ball conduit with the valve body passageway.

A ball valve is usually actuated or rotated through a stem which passes through the valve body and attaches to the ball. A handle or some other means, such as a gear, may be attached to the opposite end of the stem in order to turn the stem. The amount of fluid passing through the ball valve changes as the ball rotates. A particular angular orientation of the ball corresponds to a particular degree of alignment between the conduit and the passageway, which in turn corresponds to the flow rate.

During the life of the ball valve, switching the ball between the "on" and "off" positions subjects the valve seats to thermal cycling, which can damage the valve seats and cause the seats to experience "creep," which degrades the seal and causes leakage within the ball valve assembly. Valve seats made of softer, more elastic materials require less compressive force to seal the ball; however, such softer, more elastic materials are more susceptible to creep, which may occur rapidly at elevated temperatures. To compensate, valve seats are often configured to provide a maximum physical compression against the ball, wherein the sealing force may be maintained even if some thermal degradation or creep occurs. However, such compressive forces require more torque to operate the ball valve.

BRIEF SUMMARY

Various embodiments of the present disclosure comprise a seal carrier for a ball valve assembly, including a carrier body configured to be located between a ball of the ball valve assembly and a portion of a valve body extending transverse to the direction of fluid flow through the ball valve assembly. The carrier body comprises an annular channel in a side of the carrier body to be located proximate the ball, and the annular channel is configured to carry a ring seal. A flow path extends through a central region of the carrier body. The carrier body also can include a spring located at a peripheral portion of the carrier body, wherein an end portion of the spring is configured to abut against the portion of the valve body. The spring is configured to provide a compressive force between the portion of the valve body and the ball in a direction parallel with the direction of fluid flow through the ball valve assembly.

Other embodiments of the present disclosure comprise a ball valve assembly, including a valve body having a ball therein and a seal carrier mounted within the valve body between the ball and a portion of the valve body extending transverse to the direction of fluid flow through the ball valve assembly when the ball is in the fully open position. The seal carrier may include a carrier body having a flow path extending therethrough and a spring located at a peripheral portion of the carrier body. The spring is configured to provide a compressive force between the portion of the valve body and the ball in a direction parallel with the direction of fluid flow through the ball valve assembly. A first ring seal can be located directly between the seal carrier and the ball, wherein the first ring seal is forced into sealing engagement with the ball by the compressive force of the spring; and a second ring seal is located between an end portion of the spring and the portion of the valve body.

In alternative embodiments, the present disclosure comprises a method of forming a seal carrier for a ball valve assembly, including providing a carrier body configured to be located between a ball of the ball valve assembly and a portion of a valve body extending transverse to the direction of fluid flow through the ball valve assembly. The method may also include forming an annular channel for a ring seal in a side of the carrier body to be located proximate the ball, and forming a flow path through a central region of the carrier body. The method may also include providing a spring at a peripheral portion of the carrier body. An end portion of the spring can be configured to abut against the portion of the valve body, and the spring is configured to provide a compressive force between the portion of the valve body and the ball in a direction parallel with the direction of fluid flow through the ball valve assembly in a manner to force the ring seal into sealing engagement with the ball to inhibit the ingress of fluid between the ball and seal carrier outside the flow path.

DETAILED DESCRIPTION

The illustrations presented herein are, in some instances, not actual views of any particular valve, valve assembly or seal carrier, but are merely idealized representations which are employed to describe the present disclosure. Additionally, elements common between figures may retain the same numerical designation.

Common ball valve assemblies include a ball contained in a valve body between two valve seats with physical compression applied to the seats during assembly such that the seats bear into the ball with force. In such designs, the valve seats act as a seal at the point at which they bear onto the ball. The valve seats also act as a seal at points at which they bear against the valve body. The valve seats also act as a spring to maintain the sealing force during operation of the valve. This design is problematic in that softer, more elastic materials, which require less compressive force to form a seal against the ball, are less resilient to thermal stressing over the life of the valve. Moreover, softer, more elastic materials are susceptible to higher rates of creep at any given temperature, and are prone to rapid rates of creep at elevated temperatures. An example of a common material used for valve seats that is susceptible to such problems is polytetrafluoroethylene (PTFE). Thermal stressing and creep can degrade the seal against the ball valve, and result in leakage, particularly when the ball is switched between the open and closed positions.

Figure 1:
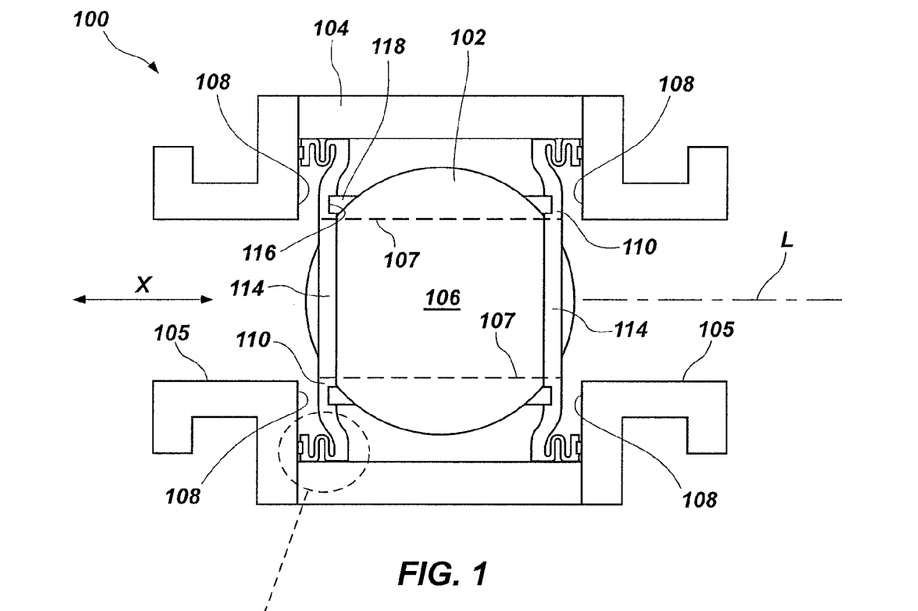
FIG. 1 illustrates a partial cross-section view of a ball valve assembly including seal carriers, according to an embodiment of the present disclosure.

Various embodiments of the present disclosure describe improved ball valve seal carriers that may fit within a traditional ball valve assembly and are formed from materials that retain their spring at elevated temperatures. Such embodiments enhance the resistance of the ball valve to thermal stress and/or cycling. FIG. 1 illustrates a partial cross-sectional view of a ball valve assembly 100 having a ball 102 mounted within the envelope of a traditional valve body 104 according to a particular embodiment. The ball 102 may be floating or trunnion mounted within the valve body 104, as is known in the art. The interior portion of the valve body 104 may define a flow path 105 in a direction X parallel with a longitudinal axis L of the valve body 104. The ball 102 includes a flow path 106 indicated by dashed lines 107, showing the ball 102 in a fully open position. As shown, the flow path 106 of the ball 102 may be coincident with the flow path 105 of the valve body 104 when the ball 102 is in the fully open position. The valve body 104 includes portions having an interior face 108 extending transverse to the direction of fluid flow through the valve body 104 on either side of the ball 102. Seal carriers 110 may be mounted within the valve body 104 on either side of the ball 102 in the direction of fluid flow through the valve assembly 100. Each seal carrier 110 may include a carrier body 112 having a generally circular shape and a flow path 114 extending therethrough. The flow path 114 of the carrier body 112 may be formed by a milling process, a cutting process, or any other process known in the art. For purposes of conceptualization, the carrier body 112 may be said to extend in an annular configuration around the periphery of the flow path 114. As shown in FIG. 1, the flow path 114 of the seal carrier 110 may have a diameter substantially equivalent to the diameter of the flow path 106 of the ball 102; although, it is to be appreciated that the diameter of the flow path 114 of the seal carrier 110 may be larger or smaller than the diameter of the flow path 106 of the ball 102.

With continued reference to FIG. 1, the carrier body 112 of the seal carrier 110 may have an annular channel 116 formed in a side thereof facing the ball 102. A ring seal 118 may be disposed within the channel 116 and may abut an outer surface of the ball 102 to inhibit the ingress of fluid between the seal carrier 110 and the ball 102 outside their respective flow paths 106, 114. At a periphery of the carrier body 112 may be a spring mechanism 120 extending from the carrier body 112 in the X direction generally away from the ball 102 and toward the interior face 108 of the valve body 104 proximate the seal carrier 110. The spring mechanism 120 may be an accordion spring formed of a section of the carrier body 112, and may have an annular configuration around the circumference of the carrier body 112. As more clearly shown in FIG. 2A, the spring mechanism 120 may terminate in the X direction away from the carrier body 112 at an end portion 122 having a substantially annular, planar face 124. The annular, planar face 124 of the spring mechanism 120 may be transverse to the X direction and parallel with the interior face 108 of the valve body 104 proximate the spring mechanism 120. An annular channel 126 may be formed in the annular, planar face 124 of the spring mechanism 120. A ring seal 128 may be disposed within the channel 126 and may abut the interior face 108 of the valve body 104 to inhibit the ingress of fluid between the spring 120 and the valve body 104 radially outward of the spring 120.

The seal carrier 110, including the spring mechanism 120, may comprise metal or a metal alloy. For example, in some embodiments, the seal carrier 110 may comprise steel or stainless steel. In additional embodiments, the seal carrier 110 may comprise an austenitic nickel-chromium based alloy, such as Inconel®, produced by Special Metals Corp., headquartered in Huntington, W. Va. The seal carrier 110 may comprise a material that is resistant to the loss of spring force through temperature cycling. In additional embodiments, the seal carrier 110, including the spring mechanism 120, may be chemically coated to provide resistance to corrosion or chemical attack, and/or to prevent the seal carrier 110 from scratching the ball 102 or the valve body 104 during assembly or operation.

Figure 2A:
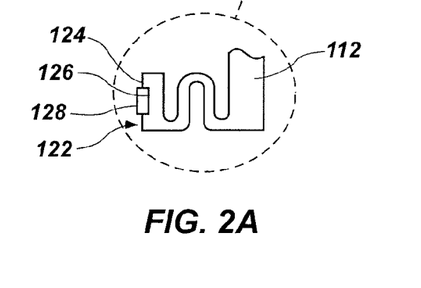
FIG. 2A illustrates an enlarged, cross-sectional view of a spring portion of one of the seal carriers illustrated in FIG. 1, wherein the spring portion directly forces a ring seal against a portion of a valve body, according to an embodiment of the present disclosure.
Figure 2B:
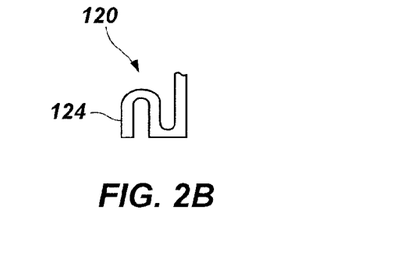
FIG. 2B illustrates a cross-sectional view of a spring portion of a seal carrier, according to an alternative embodiment of the present disclosure.
Figure 2C:
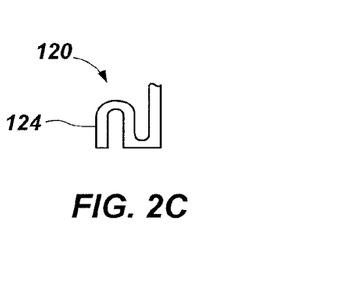
FIG. 2C illustrates a cross-sectional view of a spring portion of a seal carrier, according to an particular embodiment of the present disclosure.
Figure 2D:
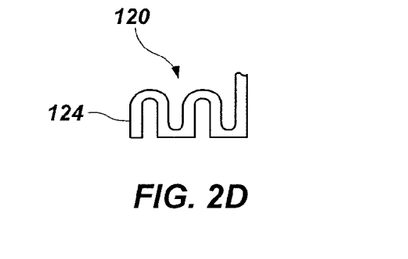
FIG. 2D illustrates a cross-sectional view of a spring portion of a seal carrier, according to another embodiment of the present disclosure.

In embodiments where the spring mechanism 120 comprises an accordion spring, the spring 120 may have three folds, as shown in FIG. 2A. However, in other embodiments, the spring 120 may have one fold (FIG. 2B), two folds (FIG. 2C), four folds (FIG. 2D), or more than four folds.

Figures 3, 4:
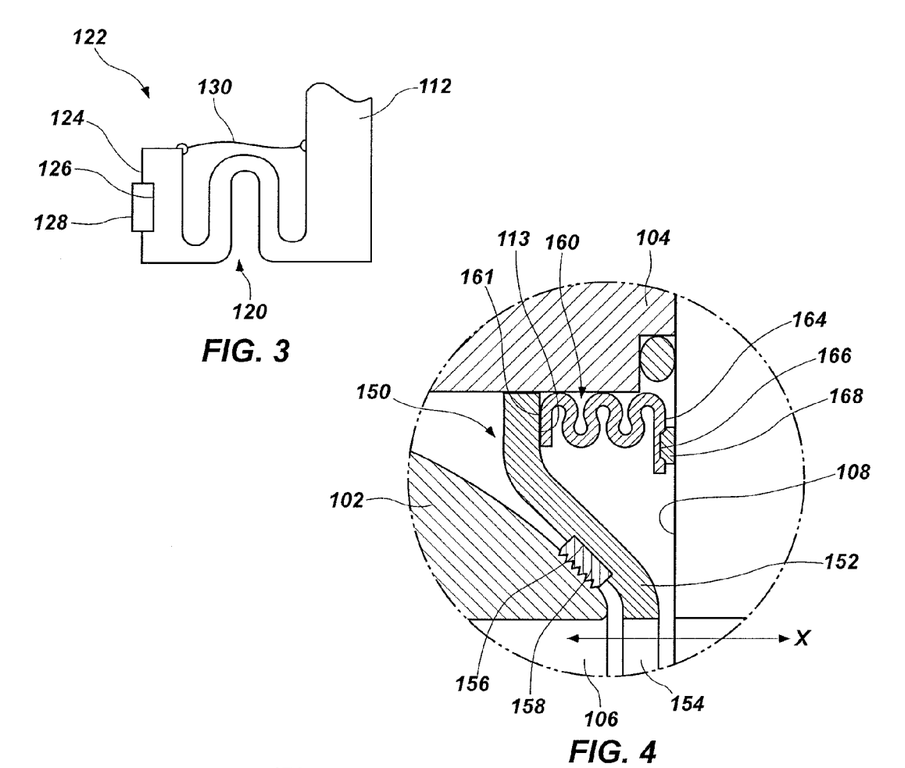
FIG. 3 illustrates a cross-sectional view of the spring portion of the seal carrier of FIG. 2 including a bellows-type seal disposed over the spring portion, according to an embodiment of the present disclosure.
FIG. 4 illustrates a cross-sectional view of a spring element rigidly affixed to a portion of a seal carrier, wherein the spring element directly forces a ring seal against a portion of a valve body, according to an alternative embodiment of the present disclosure.

In some embodiments, the fluid flow through the valve assembly 100 may contain particulates or be conducive to the build-up of deposits. In such embodiments, as shown in FIG. 3, a flexible, thin-walled, bellows-type cylindrical sheet 130 of material may be affixed to the end portion 122 of the spring 120 and extend to an attachment point on the carrier body 112 in a manner to prevent the build-up of deposits or particular material in the folds of the spring 120. In such embodiments, the sheet 130 may be affixed to the end portion 122 of the spring 120 and to the carrier body 112 by laser welding or any other precision welding method.

As shown in FIG. 1, the ball 102 may be trapped between the two seal carriers 110 by the spring mechanism 120 of each seal carrier 110. More specifically, the spring mechanism 120 of each seal carrier 110 can be a compression spring. Therefore, during assembly, as the spring mechanisms 120 are compressed against the interior faces 108 of the valve body 104 as the seal carriers 110 are mounted on opposing sides of the ball 102, a reactionary force is exerted by the spring mechanisms 120 forcing the ring seals 118 of the carrier body 110 directly against an outer surface of the ball 102 in the X direction. In this manner, the ring seals 118 of each carrier body 110 may be said to be "energized" by their respective spring mechanisms 120. The spring mechanisms 120 apply enough force press ring seals 118 against the outer surface of the ball 120 to maintain sealing engagement between the rings seals 118 and the ball 102 during operation of the valve. Additionally, the rings seals 128 at the face 124 of the end portion 122 of each of the spring mechanisms 120 are forced directly against the interior faces 108 of the valve body 104 in the X direction. In this manner, the ring seals 128 of the spring mechanisms 120 may be said to be "energized" by their respective spring mechanisms 120.

The ball valve assembly 100 illustrated in FIG. 1 provides distinct advantages over traditional ball valves. In particular, both the ring seals 118, 128 of each seal carrier 110 are energized by the spring mechanism 120, reducing the amplitude of thermal cycling exerted on the ring seals 118, 128. Additionally, the ring seals 118, 128 utilize a smaller volume of material in relation to traditional valve seats, allowing design freedom for more specialized, exotic sealing ring configurations to maximize efficiency of material usage. Moreover, as previously described, the seal carriers 110 of FIG. 1 may be interchangeable with traditional valve seats, allowing a traditional ball valve assembly to be retrofitted with the embodiments disclosed herein. Further advantages of the seal carriers 110 in the present disclosure include the ability to increase flexibility of the seal carrier 110 without sacrificing the thermal integrity and durability of the seal. For example, the spring mechanisms 120 of the seal carriers 110 in FIG. 1 may be designed with greater flexibility than a traditional valve seat, requiring greater physical compression during assembly to generate the same sealing force against the ball 102 in the X direction. This would have the beneficial effects of reducing the degree to which the sealing force is influenced by the manufacturing tolerances of the ball and valve seat, allowing for more control over the sealing force via the compressive force of the springs 120. This would also reduce the effect on the sealing force caused by wear on the sealing rings 118, 128 due to switching, and would provide a more constant sealing force over the life of the ball valve assembly.

Better control of the sealing force on the ball allows the compressive force of the springs 120 to be contained within a more narrow range of forces. Such a narrower range of sealing forces, in combination with the ability to select the carrier 110 material for its spring properties independent of the seal material, causes the maximum sealing force of the ball valve to be reduced, leading to a reduction in torque required to operate the valve.

In FIGS. 1 through 3, a seal carrier 110 is shown having a spring mechanism 120 formed of a portion of the seal carrier 110. In FIGS. 4 through 7, different embodiments of a seal carrier are shown, wherein the seal carrier has a separate spring mechanism rigidly affixed thereto. Such embodiments, as shown in FIGS. 4 through 7, maintain the advantages previously described in reference to FIGS. 1 through 3 relating to interchangeability with traditional valve seats and enhanced control of the sealing force independent of the seal material.

Referring now to FIG. 4, a partial cross-sectional view of a seal carrier 150 is illustrated mounted in a valve body 104 between a ball 102 and an interior face 108 of the valve body 104 extending transverse to the direction of fluid flow through the valve body 104. The seal carrier 150 may be generally similar to the seal carrier 110 illustrated in FIGS. 1 through 3, and may have a carrier body 152 with a flow path 154 extending therethrough. A side of the carrier body 152 facing the ball 102 may have an annular channel 156 with a ring seal 158 disposed therein abutting the outer surface of the ball 102. A spring mechanism 160 may be rigidly attached to a peripheral portion of the carrier body 152. The spring mechanism 160 may be an accordion spring having a first end face 161 attached by welding or brazing to a peripheral, transverse face 113 of the carrier body 152. The spring mechanism 160 may have an annular configuration, and may extend from the peripheral, transverse face 113 of the carrier body 152 in the X direction away from the ball 102 and toward the interior face 108 of the valve body 104. The spring mechanism 160 may have a second end face 164 opposite the first end face 161, wherein the second end face 164 is parallel with the interior face 108 of the valve body 104 proximate the spring mechanism 160. An annular channel 166 may be formed in the second end face 164 of the spring mechanism 160, and a ring seal 168 may be disposed within the channel 166 and may abut the interior face 108 of the valve body 104.

While FIG. 4 only shows a portion of one seal carrier 150, it is understood that the ball 102 is trapped between two seal carriers located on opposite sides of the ball 102. As previously described with reference to FIG. 1, the spring mechanism 160 in FIG. 4 is compressed against the interior face 108 of the valve body 104 as the seal carrier 150 is mounted, creating a reactionary force by the spring mechanism 160 in the direction of the ball 102, forcing the ring seal 158 directly against the outer surface of the ball 102 in the X direction, thus energizing the ring seal 158 and supplying sufficient force to maintain sealing engagement between the ring seal 158 and the ball 102 during operation of the valve. Additionally, as previously described, the ring seal 168 at the second end face 164 of the spring mechanism 160 is forced directly against the interior face 108 of the valve body in the X direction, thus also energizing the ring seal 168.

Figure 5:
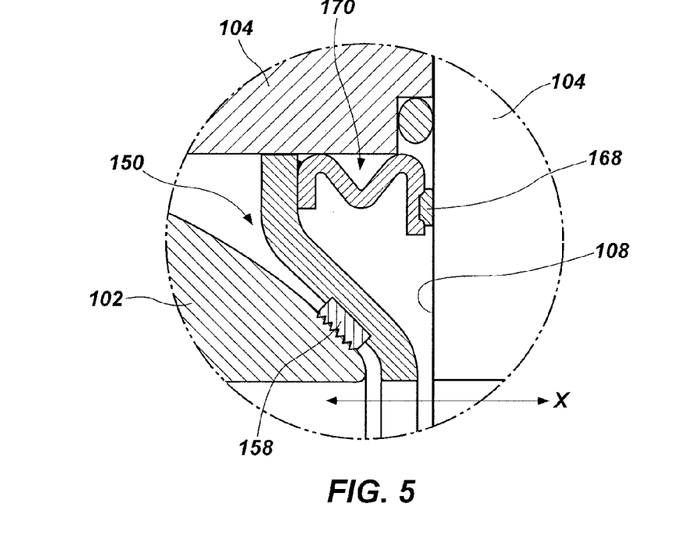
FIG. 5 illustrates a cross-sectional view of a spring element with an increased thickness rigidly affixed to a portion of a seal carrier, according to another embodiment of the present disclosure.

FIG. 5 illustrates an additional embodiment of a seal carrier 150 with a spring mechanism 170 attached thereto, wherein the seal carrier 150 and spring mechanism 170 are mounted between a ball 102 and an interior face 108 of the valve body 104. The spring mechanism 170 may be an annular accordion spring rigidly affixed to a peripheral portion of the seal carrier 150 by welding or brazing. The seal carrier 150 and the spring mechanism 170 may be similar in structure to those described previously with reference to FIG. 4, with the primary difference being that the spring mechanism 170 in FIG. 5 has a thicker, stiffer, more robust design than the spring mechanism 160 of FIG. 4. The spring mechanism 170 may thus be capable of providing a greater sealing load in the X direction, and may be used in applications where a greater sealing load is required. The spring mechanism 170 also provides the advantage of energizing both the ring seal 158 in sealing engagement with the ball 102 and the ring seal 168 in sealing engagement with the interior surface 108 of the valve body 104. While the spring mechanism 170 is illustrated as a separate component rigidly affixed to the seal carrier 150, it is to be appreciated that a thicker spring mechanism, such as the spring mechanism 170, may be more readily machined from solid than its thinner counterparts, and therefore may alternatively be formed of a section of the carrier body 150, as previously described.

Figure 6:
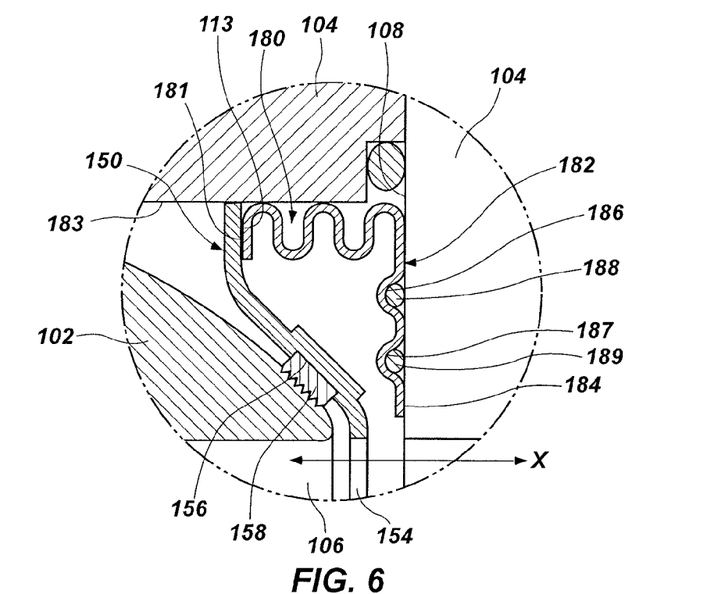
FIG. 6 illustrates a cross-sectional view of a spring element rigidly affixed to a portion of a seal carrier, wherein the spring element has an end feature for locating at least one ring seal against a portion of the valve body, according to an embodiment of the present disclosure.

Referring now to FIG. 6, an alternative embodiment of a separate spring mechanism 180 attached to a seal carrier 150 is shown. The seal carrier 150 may be generally similar to the seal carriers 110, 150 illustrated in FIGS. 1 through 5, and may have a carrier body 152 with a flow path 154 extending therethrough. A side of the carrier body 152 facing the ball 102 may have an annular channel 156 with a ring seal 158 disposed therein abutting the outer surface of the ball 102. A spring mechanism 180 may be rigidly attached to a peripheral portion of the carrier body 152, as previously described. The spring mechanism 180 may be an accordion spring having a first end face 181 attached by welding or brazing to a peripheral, transverse face 113 of the carrier body 152. The spring mechanism 180 may have an end portion 182 on a side of the spring 180 opposite the first end face 181. The end portion 182 may be bent to extend transverse to the X direction from an interior, longitudinal wall 183 of the valve body 104 to a radial location near the outer diameter of the flow path 154 of the carrier body 152. An outer, transverse face 184 of the end portion 182 may abut the interior, transverse face 108 of the valve body 104, and may have two grooves 186, 187 formed therein. A ring seal 188, 189 may be located in each of the grooves 186, 187, and may be held in place, or "trapped," by the end portion 182 of the spring mechanism 180. In such an embodiment, the rings seals 188, 189 are not forced against the interior, transverse face 108 of the valve body 104 by the full compressive force of the spring mechanism 180, and thus they are not fully energized by the spring mechanism 180. As a result, the ring seals 188, 189 are more susceptible to thermal cycling during operation of the ball valve. However, in return, the spring mechanism 180 may be formed by simpler, less expensive manufacturing techniques. For example, instead of machining channels into a narrow end face of the spring mechanism, such as the annular channel 166 in the end face 164 of the spring mechanism 160 shown in FIG. 4, the grooves 186, 187 may be formed by bending the end portion 182 of the spring mechanism 180.

Figure 7:
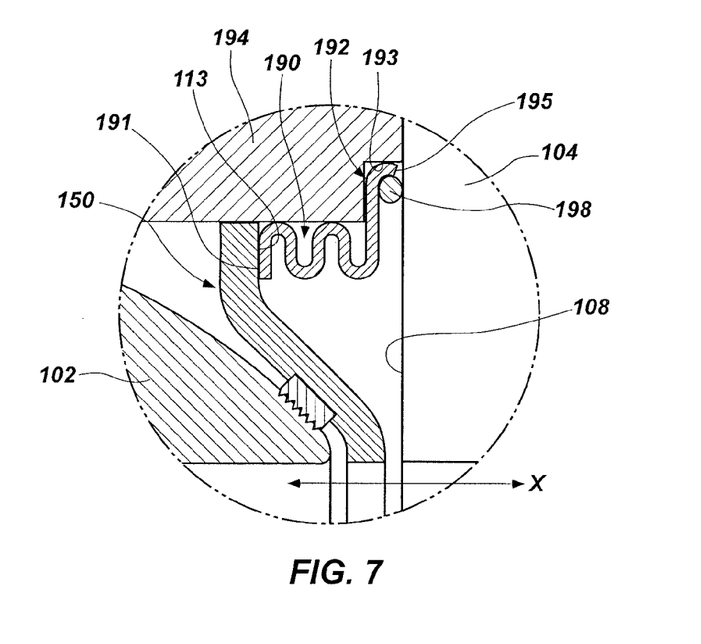
FIG. 7 illustrates a cross-sectional view of a spring element rigidly affixed to a portion of a seal carrier, wherein the spring element has an end feature for locating a ring seal against a portion of the valve body, according to yet another embodiment of the present disclosure.

Referring now to FIG. 7, an additional embodiment of a separate spring mechanism 190 is shown. The spring mechanism 190 may be rigidly attached to a peripheral portion of the carrier body 152, as previously described. The spring mechanism 190 may be an accordion spring having a first end face 191 attached by welding or brazing to a peripheral, transverse face 113 of the carrier body 152. The spring mechanism 190 may have an end portion 192 on an opposite side of the spring 190 from the first end face 191. The end portion 192 may extend radially outward of the remaining portion of the spring mechanism 190 in a direction transverse to the X direction and into a channel 193 in a longitudinal portion 194 of the valve body 104. The end portion 192 may bend in a manner such that an end face 195 of the spring opposite the first end face 191 is transverse to the X direction and abuts the interior, transverse face 108 of the valve body 104. The bend in the end portion 192 may be configured to hold a ring seal 198 in sealing engagement between the end portion 192 of the spring 190 and the interior, transverse face 108 of the valve body 104. As with the ring seals 188, 189 of FIG. 6, the rings seal 198 in FIG. 7 is not forced against the interior, transverse face 108 of the valve body 104 by the full compressive force of the spring mechanism 190. However, in return, the spring mechanism 190 may be formed by simpler, less expensive manufacturing techniques.

Figure 8:
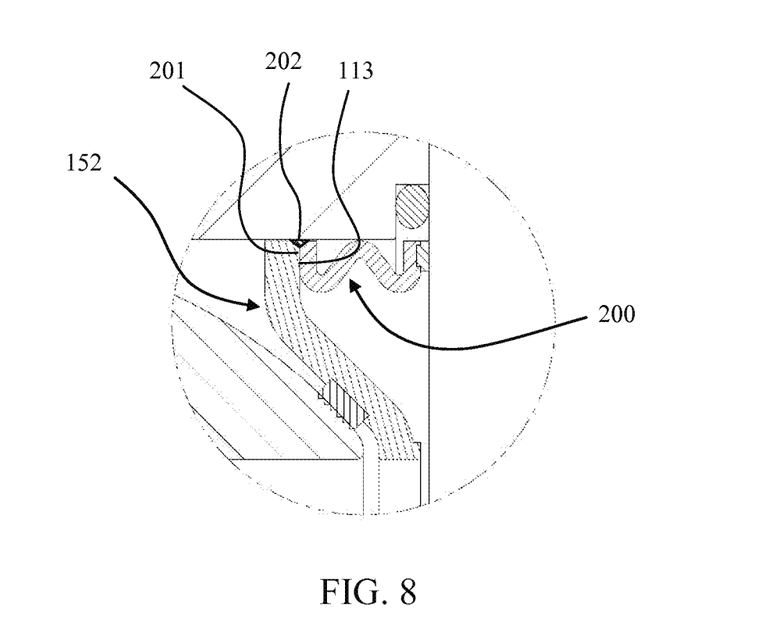
FIG. 8 illustrates a cross-sectional view of a spring element rigidly affixed to a portion of a seal carrier, wherein the fold of the spring element abutting the seal carrier points radially inward, according to an embodiment of the present disclosure.

Referring now to FIG. 8, an alternative embodiment of a separate spring mechanism 200 is shown. The spring mechanism 200 may be an annular accordion spring having a first end face 201 welded to the peripheral, transverse face 113 of the carrier body, as previously described. However, in this embodiment, the first fold of the annular accordion spring 200 abutting the peripheral, transverse face 113 of the carrier body 152 points radially inward, allowing a weld 202 to be applied at the outer radial extremity of the interface between the first end face 201 of the spring mechanism 200 and the peripheral, transverse face 113 of the carrier body 152 and hence away from the first fold of the spring mechanism 200.

Figure 9:
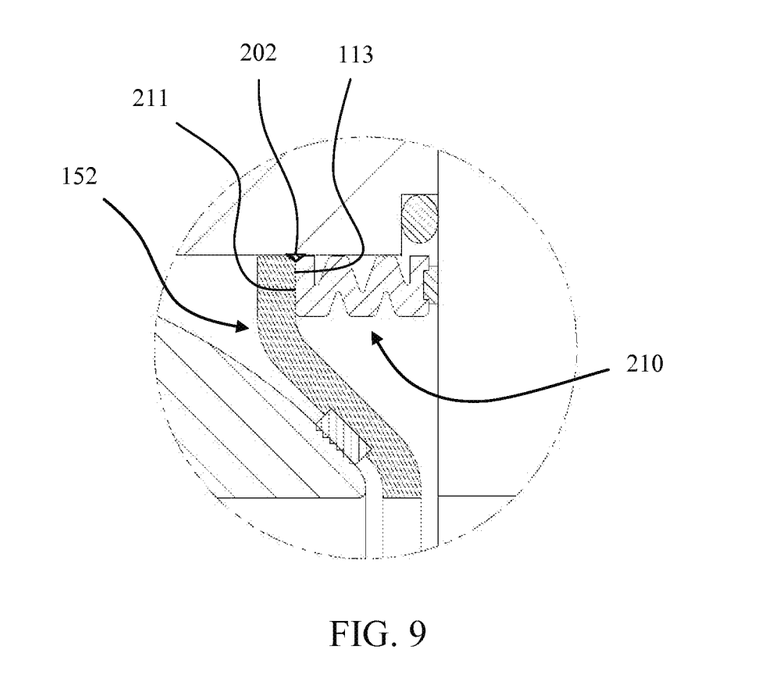
FIG. 9 illustrates a cross-sectional view of an alternative embodiment of a spring element rigidly affixed to a portion of a seal carrier, wherein the fold of the spring element abutting the seal carrier points radially inward, according to an embodiment of the present disclosure.

Referring now to FIG. 9, an alternative embodiment of a separate spring mechanism 210 is shown. The spring mechanism 210 may be an annular accordion spring having a first end face 211 welded to the peripheral, transverse face 113 of the carrier body, as previously described, with a weld 202 applied at the outer radial extremity of the interface between the first end face 211 of the spring mechanism 210 and the peripheral, transverse face 113 of the carrier body 152 and hence away from the first fold of the spring mechanism 210.

In this embodiment, the spring mechanism 210 includes a thicker cross-section and an increased number of folds in relation to the spring mechanism 200 in FIG. 8. The increased number of folds in the spring mechanism of FIG. 9 allows for increased flexibility relative to a spring with the same thickness and fewer folds.

Figure 10:
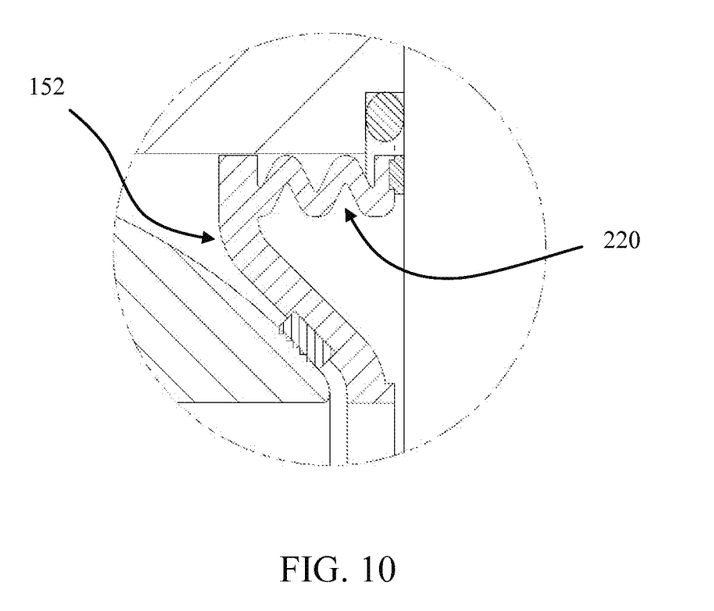
FIG. 10 illustrates a cross-section view of an alternative embodiment of a spring element formed of a peripheral portion of a seal carrier, according to an embodiment of the present disclosure.

Referring now to FIG. 10, an alternative embodiment of a spring mechanism 220 is shown. The spring mechanism 220 may have a structure similar to the spring mechanism 210 of FIG. 9; however, in this embodiment, the spring mechanism 220 may be formed of a peripheral portion of the carrier body 152. By way of a non-limiting example, the carrier body 152, including the spring mechanism 220, may be machined from a single solid piece of material.

Figure 11:
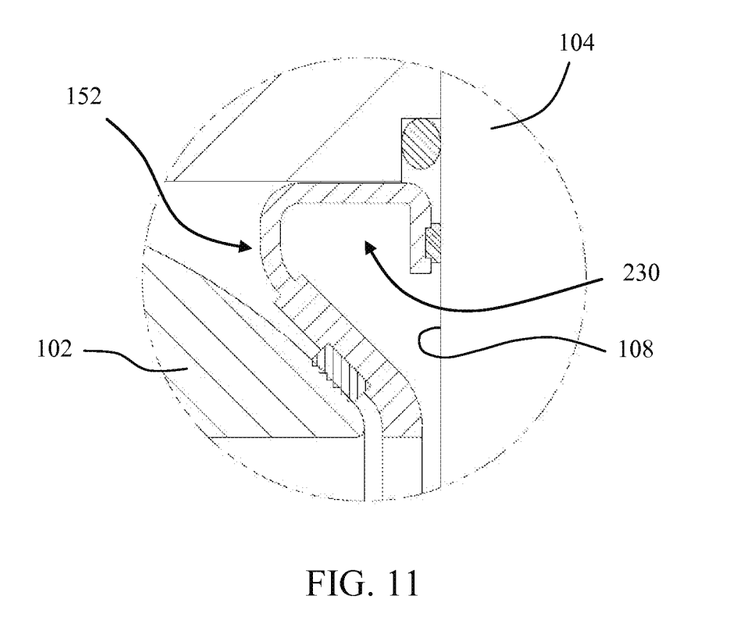
FIG. 11 illustrates a cross-section view of an alternative embodiment of a spring element formed of a peripheral portion of a seal carrier, wherein the spring element has a reduced thickness, according to an embodiment of the present disclosure.

Referring now to FIG. 11, an alternative embodiment of a spring mechanism 230 is shown. The spring mechanism 230 may have a structure similar to the spring mechanism 120 shown in FIG. 2B, and may be formed of a peripheral portion of the carrier body 152. In such an embodiment, the spring mechanism 230 may comprise an annular, compliant portion of the carrier body having a reduced thickness in relation to the portion of the carrier body 152 radially inward of the spring mechanism 230. The spring mechanism 230 may extend from the carrier body 152 to the transverse face 108 of the valve body 104, and may exert a compressive force against the transverse face 108 of the valve body 104 and the ball 102 in the direction of fluid flow through the valve body 104. The reduced thickness of the spring mechanism 230 may enhance the compliance, or "springiness" of the spring mechanism 230.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims which follow.

What is claimed is:

1. A seal carrier for a ball valve assembly, comprising:
   a carrier body configured to be located between a ball of the ball valve assembly and a portion of a valve body, the carrier body comprising an annular channel in a side of the carrier body to be located proximate the ball, the annular channel carrying a first ring seal;
   a flow path extending through a central region of the carrier body; and
   a spring located at a peripheral portion of the carrier body, wherein the spring is formed of a section of the carrier body or is a separate piece attached to the carrier body by one of welding and brazing, an end portion of the spring including a recess carrying a second ring seal configured to abut against the portion of the valve body;
   wherein the seal carrier is configured to transmit the compressive force of the spring directly to the first ring seal in a manner to force the first ring seal into sealing engagement with the ball in a direction parallel with the direction of fluid flow through the valve body, and transmit the compressive force of the spring directly to the end portion of the spring in a manner to force the second ring seal into sealing engagement with the valve body, the seal carrier inhibiting fluid ingress between the portion of the valve body and the end portion of the spring and inhibiting fluid ingress between the seal carrier and the ball;
   wherein the seal carrier and spring do not comprise surfaces in slidable contact with each other.

2. The seal carrier of claim 1, wherein the spring is an accordion spring.

3. The seal carrier of claim 2, further comprising a layer of coating material disposed over the spring.

4. The seal carrier of claim 2, further comprising an annular, bellows-type sheet welded to a radially-inward portion of the spring to inhibit formation of deposits or ingress of particulate matter between folds of the spring.

5. A ball valve assembly, comprising:
   a valve body having a ball therein;
   a seal carrier mounted within the valve body between the ball and a portion of the valve body, the seal carrier comprising:
      a carrier body having a flow path extending therethrough;
      a spring located at a peripheral portion of the carrier body, wherein the spring is formed of a section of the carrier body or is a separate piece attached to the carrier body by one of welding and brazing, the spring configured to provide a compressive force between the portion of the valve body and the ball in a direction parallel with the direction of fluid flow through the valve body;
   a first ring seal located directly between the seal carrier and the ball, wherein the first ring seal is forced into sealing engagement with the ball by the compressive force of the spring; and
   a second ring seal carried in a recess in an end portion of the spring, the second ring seal abutting against the portion of the valve body to inhibit ingress of fluid between the portion of the valve body and the end portion of the spring
   the seal carrier and first and second ring seals thereby forming a system configured to inhibit fluid ingress between the portion of the valve body and the end portion of the spring and inhibit fluid ingress between the seal carrier and the ball, without surfaces of the seal carrier in slidable contact with each other.

6. The ball valve assembly of claim 5, wherein the spring is an accordion spring.

7. The ball valve assembly of claim 5, wherein no structural components of the ball valve assembly are disposed between any folds of the spring.

8. The ball valve assembly of claim 5, wherein the second ring seal is forced into sealing engagement with the portion of the valve body by the compressive force of the spring.

9. The ball valve assembly of claim 5, wherein the spring is formed of one of a metal and a metal alloy that is resistant to a loss of spring force caused by temperature cycling.

10. The ball valve assembly of claim 5, further comprising:
    a second seal carrier mounted within the valve body on a side of the ball opposite the seal carrier, wherein the second seal carrier is mounted between the ball and a second portion of the valve body;
    a third seal ring located directly between the second seal carrier and the ball, wherein the third seal ring is forced into sealing engagement with the ball by the compressive force of a spring of the second seal carrier; and
    a fourth ring seal located between an end portion of the spring of the second seal carrier and the second portion of the valve body the second seal carrier and third and fourth ring seals thereby forming a system on the side of the ball opposite the seal carrier configured to inhibit fluid ingress between the portion of the valve body and the end portion of the spring and inhibit fluid ingress between the second seal carrier and the ball.

11. A method of forming a seal carrier for a ball valve assembly, comprising:

providing a carrier body configured to be located between a ball of the ball valve assembly and a portion of a valve body extending transverse to the direction of fluid flow through the ball valve assembly;

forming an annular channel carrying a ring seal in a side of the carrier body to be located proximate the ball;

forming a flow path through a central region of the carrier body;

providing a spring at a peripheral portion of the carrier body, wherein the spring is formed of a section of the carrier body or is a separate piece attached to the carrier body by one of welding and brazing, wherein an end portion of the spring includes a recess carrying a second ring seal configured to abut against the portion of the valve body, and the spring is configured to provide a compressive force between the portion of the valve body and the ball in a direction parallel with the direction of fluid flow through the valve body in a manner to force the ring seal into sealing engagement with the ball and to inhibit ingress of fluid between the portion of the valve body and the second ring seal at the end portion of the spring the seal carrier and first and second ring seals thereby forming a system configured to inhibit fluid ingress between the portion of the valve body and the end portion of the spring and inhibit fluid ingress between the seal carrier and the ball, without surfaces of the seal carrier and spring in slidable contact with each other.

* * * * *